(No Model.) 2 Sheets—Sheet 1.
S. H. SHORT.
MOTOR MOUNTING OF ELECTRIC CARS.
No. 452,621. Patented May 19, 1891.
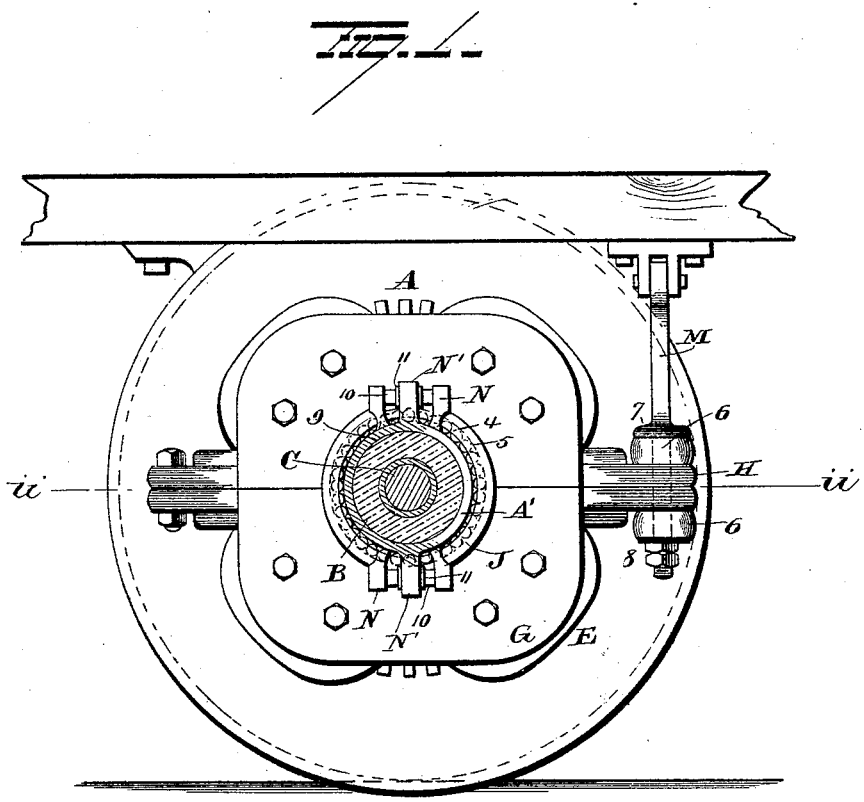

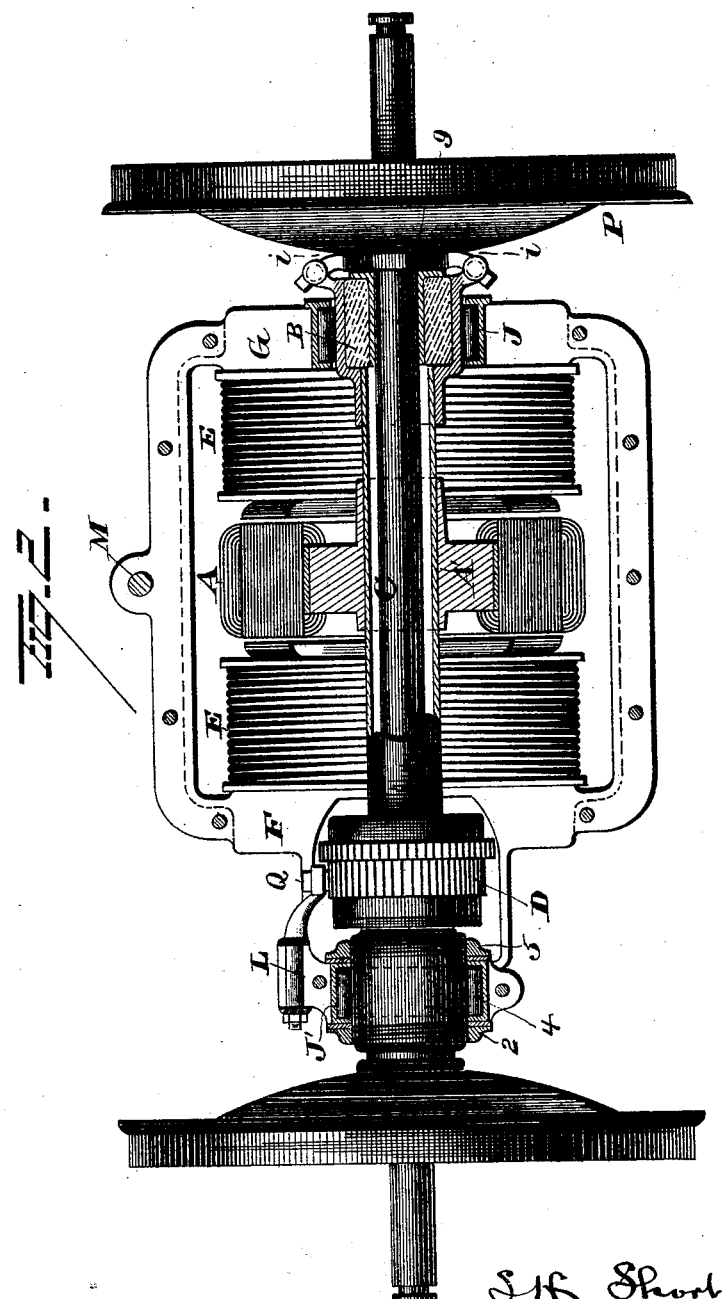

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

MOTOR MOUNTING OF ELECTRIC CARS.

SPECIFICATION forming part of Letters Patent No. 452,621, dated May 19, 1891.

Application filed November 15, 1890. Serial No. 371,508. (No model.)

*To all whom it may concern:*

Be it known that I, SIDNEY H. SHORT, of Cleveland, in the county of Cuyahoga and State of Ohio, have invented certain new and useful Improvements in Motor Mounting of Electric Cars; and I do hereby declare the following to be a full, clear, and exact description of the invention, such as will enable others skilled in the art to which it appertains to make and use the same.

This invention relates more particularly to the mounting of the propelling-motors of electric cars or vehicles in which the armature is axially mounted with reference to a driving-axle of the car, and is directly connected therewith, and in which the field-magnets are mounted on the said axle by means of journal-bearings; but it is applicable in part to electric propelling-motors in general which are mounted on a driving-axle—as, for example, by means of a frame journaled on such axle—the motor-armature being geared to the axle, as customary on the motor-cars in use.

The invention also has special reference to propelling-motors in which double-pole or multipolar field-magnets project from yokes at the sides of the armature, although not restricted to such motors.

In accordance with the present invention combined spring and roller bearings are provided between the electro-magnets or motor-frame and the driving-axle. By combining a spring and roller bearing not only are the field-magnets or motor-frame supported with but little friction on the driving-axle, but the springs protect the rollers from pounding by the motor. In what is considered the best arrangement the motor is mounted on the driving-axle through a hollow shaft with springs or buffers interposed between said shaft and the driving-axle, and roller-bearings are provided between said shaft and the non-rotative field-magnets or the frame of the motor. The use of a spring support or holder to prevent the magnets or the motor-frame from turning on the car-axles serves further to relieve the roller-bearings from pounding. The roller-bearings may be used without the springs or buffers, and the invention extends to such use. It also comprises certain particular constructions, improvements, combinations, or arrangements, as hereinafter set forth.

In the accompanying drawings, which form part of this specification, Figure 1 is a partial view in vertical section on line *i* of Fig. 2 of an electric car provided with a motor mounted in accordance with the invention; and Fig. 2 is a view in horizontal section on line *i i* of Fig. 1.

Only one car-axle and motor is shown; but a similar motor may of course be placed on the other axle. The armature A of the propelling-motor is fast on a hollow shaft A', which surrounds the driving-axle C, springs B or buffers of, say, soft vulcanized rubber being interposed. The commutator D is also fast on the shaft A'. The field-magnets E are journaled on the shaft A' by means of roller-bearings J J'. The rollers of these bearings surround the shaft A', so that they have the springs or buffers B between themselves and the car-axle C. As shown, the rollers are cylinders; but rollers of other known or suitable forms may be used. Further, as shown, the field-magnets E project from yokes F and G at the sides of the armature A. The yokes are connected by arms H and K, and the yoke F is provided with a bracket L. The roller-bearing J is placed in the yoke G, the roller-bearing J' in the bracket L. The bearing J' is between the nuts 2 and 3, which adjust the field-magnets longitudinally on the shaft A' to place the field-magnets at the proper distance on each side of the armature. The rollers 4 are shown as contained in a flanged ring 5, and the nuts 2 and 3 are shown as projecting beyond the flanged ring, so as to bear against the body of the yoke.

To facilitate the application of the field-magnets, they may be made in two parts, the line of division being longitudinally of the axles C. It is preferred to make the flanged ring in one solid piece and to slip it over the end of the hollow shaft A'. The bearing J may be secured in the yoke G in any known or suitable way.

The field-magnets are held from rotation by a connection with a part of the car adapted to that end, as the car-body or another car-axle, or a motor on another axle, or the like. Preferably there are springs interposed between the field-magnets and the wheel-base by way of such connection, such springs giving a more elastic support to the motor. As shown, there is a jointed rod M, which passes through an ear on the arm H, and springs or buffers 6 of, say, soft vulcanized rubber, are interposed between the arm H and the flange 7 and the nuts 8 on the rod M.

The coupling shown for connecting the armature directly with the driving-axle consists of the forks N on the armature-shaft A' and the arms N' on the collar 9, which is fast on the hub of a driving-wheel P. Between the arms N' and the forks N are the spring-pads 10, say of soft vulcanized rubber, metal caps 11 protecting the rubber from the wearing action of the arms N'. The coupling N N' 10, it will be observed, is self-adjusting for all movements of the armature-shaft A' and the motor thereon, the play of the arms N' between the caps 11 permitting movement of the motor in the direction of the said arms and the yielding of the spring-pads 10 permitting transverse movement. The commutator-brushes are held by the bracket L, one of them being shown at Q.

The roller-bearings J J' might be applied directly to the car-axle C, the shaft A' and the springs or buffers B being omitted. If it be desired to employ the roller-bearings with a geared motor such as now in common use on electric cars, it is only necessary to replace the field-magnets E and yokes F and G by the motor-frame, and to make a gear fast on the shaft A', in place of the armature.

In place of having the armature to rotate and the field-magnets non-rotative, the field-magnets could be allowed to rotate and the armature be held from rotating, and it will be understood that this reversed arrangement is included in the invention as a substitute for that particularly described without further specification herein.

Having fully described my invention, what I claim as new, and desire to secure by Letters Patent, is—

1. The combination, with a car, of an electric propelling-motor comprising an axially-mounted and directly-connected armature and non-rotative field-magnets mounted on a driving-axle through springs independent of the main springs of the car, and roller-bearings, substantially as described.

2. The combination, with a car, of a hollow shaft surrounding a driving-axle, springs interposed between the said shaft and axle, field-magnets on said shaft, roller-bearings between the field-magnets and hollow shaft, and the directly-connected armature and commutator on said shaft, substantially as described.

3. The combination, with a car, of an electric propelling-motor mounted on the car-axle by means of springs independent of the main springs of the car, and provided with roller-bearings, substantially as described.

4. The combination, with a car, of an electric propelling-motor carried by and cushioned from a driving-axle, with non-rotative field-magnets having roller-bearings on the armature, substantially as described.

5. The combination, with a car, of an electric propelling-motor comprising an armature mounted on and directly connected with a driving-axle, and non-rotative field-magnets projecting from yokes at the sides of the armature, said yokes having openings therein for the passage of the driving-axle and provided with roller-bearings in said openings, substantially as described.

6. The combination, with a car, of an electric propelling-motor comprising an armature mounted on and directly connected with a driving-axle and non-rotative field-magnets projecting from yokes at the sides of the armature and mounted on the driving-axle by means of roller-bearings, one of said roller-bearings being in a bracket attached to one of the yokes between nuts for adjusting the field-magnets longitudinally of the said axle, substantially as described.

7. The combination, with a car, of a hollow shaft surrounding the driving-axle, springs interposed between the said shaft and axle, and a propelling-motor mounted on said shaft and provided with roller-bearings, substantially as described.

8. The combination, with a car, of a hollow shaft surrounding the driving-axle, springs interposed between said shaft and axle, an armature and commutator on said shaft, the field-magnets at the sides of the armature, the yokes, the bracket on one of the yokes, and the roller-bearings between the said shaft and the bracket and the opposite yoke, substantially as described.

9. The flanged rings and rollers therein, in combination with the car-axle, and the motor mounted on said axle and in part supported by the journal-bearings formed by said rollers, substantially as described.

10. The flanged rings and the rollers therein, in combination with the car-axle, the armature mounted on said axle, and the field-magnets and yokes mounted on said axle through the journal-bearings formed by said rollers, substantially as described.

11. The combination of a car and an electric propelling-motor, comprising an axially-mounted and directly-connected armature carried upon and cushioned from a driving-axle, with non-rotative field-magnets carried upon the armature-axis, and roller-bearings interposed between the two, substantially as described.

In testimony whereof I have signed this specification in the presence of two subscribing witnesses.

SIDNEY H. SHORT.

Witnesses:
A. B. CALHOUN,
JNO. T. HUNTINGTON.